(12) United States Patent
Chen et al.

(10) Patent No.: US 7,263,564 B2
(45) Date of Patent: Aug. 28, 2007

(54) INQUIRING APPARATUS AND METHOD THEREOF

(75) Inventors: Yung-Huei Chen, Taipei (TW); Jar-Haur Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 481 days.

(21) Appl. No.: 10/873,011

(22) Filed: Jun. 21, 2004

(65) Prior Publication Data
US 2005/0060593 A1 Mar. 17, 2005

(30) Foreign Application Priority Data
Sep. 3, 2003 (TW) .............................. 92124399 A

(51) Int. Cl.
*G06F 3/00* (2006.01)
(52) U.S. Cl. ............................ 710/19; 710/18; 710/46; 710/47; 710/109; 713/300; 713/320; 713/321; 713/322; 713/323; 713/324; 713/340
(58) Field of Classification Search .................. 710/18, 710/19; 713/322, 323
See application file for complete search history.

(56) References Cited

U.S. PATENT DOCUMENTS

| | | | |
|---|---|---|---|
| 5,319,785 A * | 6/1994 | Thaller ........................ | 710/15 |
| 5,706,210 A * | 1/1998 | Kumano et al. ............ | 709/224 |
| 5,926,640 A * | 7/1999 | Mason et al. ............... | 713/320 |
| 6,125,450 A | 9/2000 | Kardach | |
| 6,460,143 B1 * | 10/2002 | Howard et al. ............. | 713/323 |
| 6,516,352 B1 * | 2/2003 | Booth et al. ................ | 709/250 |
| 6,567,921 B1 * | 5/2003 | Guziak ........................ | 713/322 |
| 6,678,831 B1 * | 1/2004 | Mustafa et al. ............. | 713/320 |
| 6,691,238 B1 * | 2/2004 | Forbes et al. ............... | 713/323 |
| 2003/0126481 A1 * | 7/2003 | Payne ......................... | 713/300 |

OTHER PUBLICATIONS

"PCI Express Architecture Power Management" Kwa et al., Nov. 8, 2002.

* cited by examiner

*Primary Examiner*—Donald Sparks
*Assistant Examiner*—Niketa Patel
(74) *Attorney, Agent, or Firm*—Thomas, Kayden, Horstemeyer & Risley

(57) ABSTRACT

An inquiring apparatus and method thereof is provided for assisting the CPU to inquire the state of the peripheral device. When the CPU needs to perform an inquiring process to wait for a peripheral device to come to an expected state, an inquiring apparatus is activated, instead of the CPU, to perform an inquiring process. The CPU is placed in a power-saving state which stops outputting the clock to the CPU when the inquiring apparatus performs the inquiring process. The inquiring process includes outputting a read cycle to the peripheral device receiving a current state of the peripheral device in response to the read cycle; and comparing the current state with the expected state. If the current state and the expected state are the same, the clock is outputted to the CPU again.

15 Claims, 3 Drawing Sheets

INQUIRING APPARATUS AND METHOD THEREOF

This application claims the benefit of Taiwan application Serial No. 092124399, filed Sep. 3, 2003, the subject matter of which is incorporated herein by reference.

BACKGROUND OF THE INVENTION

1. Field of the Invention

The invention relates in general to an inquiring apparatus and method thereof, and more particularly to an inquiring apparatus, which can assist the central processor unit (CPU) to reduce its processing time and power consumption, and method thereof.

2. Description of the Related Art

A CPU is a high power-consuming element in electronic products. Even when the CPU is in a standby state, such as waiting for peripheral devices to be ready, it consumes power as operating according to the clock signals.

As the CPU is in the standby state, there are two methods that the CPU can detect the current state of the peripheral device. One is called an interrupting method, in which the peripheral device automatically output an interrupting signal to the CPU. Before the peripheral device awakens the CPU, no clock is output to the CPU, so some power consumption is reduced. As the peripheral device detects an input event, such as the user operates the keyboard, the peripheral device will output an interrupting signal to wake up the CPU to perform the corresponding programs.

Each interrupting signal is input to a different pin of the CPU. Since the number of the CPU pins is limited, the CPU cannot provide enough pins for a variety of peripheral devices.

The other one is a repeatedly polling method, in which the CPU itself inquires the peripheral device repeatedly to determine if the peripheral device comes to an expected state.

Referring to FIG. 1, a flow chart of the conventional repeatedly polling method is shown. First, the CPU reads the current state of the peripheral device in the step 110. Afterwards, the CPU determines if the current state of the peripheral device agrees with the expected state in the step 120. If not, it needs to wait for a period of time in the step 130, such as to execute the command NOP (No Operation), and then to go back to the step 110. If it does, the method is ended.

However, as described in the repeatedly polling method, even in the standby state, the CPU needs to work and the clock is required to be continuously outputted to the CPU. The CPU needs to inquire the peripheral device repeatedly until the peripheral device comes to the expected state. Therefore, such inquiring method will not only waste the CPU's processing time but also be power consuming.

SUMMARY OF THE INVENTION

It is therefore an object of the invention to provide a power-saving inquiring apparatus, which, instead of the CPU, can repeatedly inquire the peripheral device and awaken the CPU when the inquiring apparatus detects that the peripheral device is ready, and method thereof.

The invention achieves the above-identified objects by providing an inquiring apparatus installed in an electronic apparatus. The electronic apparatus includes a CPU, a clock controller, a main bus, and a peripheral device. The peripheral device is coupled to the main bus. The inquiring apparatus includes a multiplexer and an awakening unit. The multiplexer selectively couples a first bus or a second bus with the main bus, and the first bus is coupled to the CPU. The awakening unit is coupled to the second bus. When the CPU needs to perform the repeatedly inquiring process, the CPU activates the inquiring apparatus so that the multiplexer couples the second bus with the main bus to enable the awakening unit, and the CPU can be placed in a state of power-saving in which the clock controller stops outputting the clock to the CPU. When the awakening unit is enabled, it will inquire about the current state of the peripheral device repeatedly. When the current state agrees with the expected one, the awakening unit outputs an awakening signal to the clock controller so as to enable the clock controller to output the clock to the CPU again.

The invention achieves the above-identified objects by providing an inquiring method for assisting the CPU to repeatedly inquire a peripheral device. The inquiring method includes the steps of: when the CPU needs to perform an inquiring process to wait for a peripheral device to come to an expected state, informing an inquiring apparatus of at least an address of the peripheral device to activate the inquiring apparatus; performing the inquiring process by the inquiring apparatus, instead of the CPU, when the inquiring apparatus is activated; placing the CPU in a power-saving state which stops outputting the clock to the CPU when the inquiring apparatus performs the inquiring process; wherein the inquiring process comprises: outputting a read cycle to the peripheral device; receiving a current state of the peripheral device in response to the read cycle; and comparing the current state with the expected state.

Other objects, features, and advantages of the invention will become apparent from the following detailed description of the preferred but non-limiting embodiments. The following description is made with reference to the accompanying drawings.

DETAILED DESCRIPTION OF THE INVENTION

When the CPU needs to wait for the peripheral device to come to the expected state so as to perform the follow-up operation, conventionally, either the interrupting method or the repeatedly polling one is used to detect the state of the peripheral device. If the repeatedly polling method is used, the CPU does not perform other programs and just wastes time in repeatedly inquiring the current state of the peripheral device until the peripheral device comes to the expected state. Therefore, this method not only wastes the CPU's processing time but also is power consuming. In the invention, a low power-consuming inquiring apparatus is used instead of the CPU to perform the repeatedly inquiring process. Since the inquiring apparatus, instead of the CPU, performs the inquiring process, the CPU is in a state of power saving in which no clock signal is outputted to the CPU. The CPU is awakened as the detected state of the peripheral device agrees with the expected state.

Figure 1:
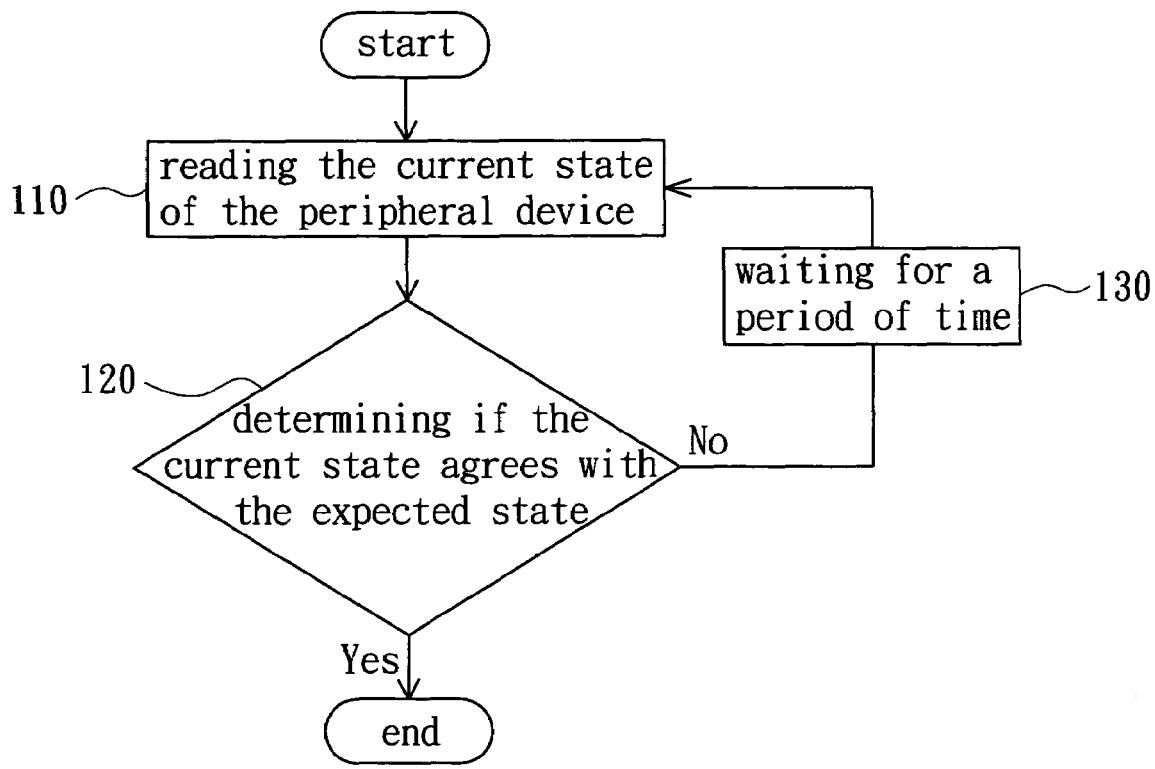
FIG. 1 is a flow chart of the conventional repeatedly polling method.
Figure 2:
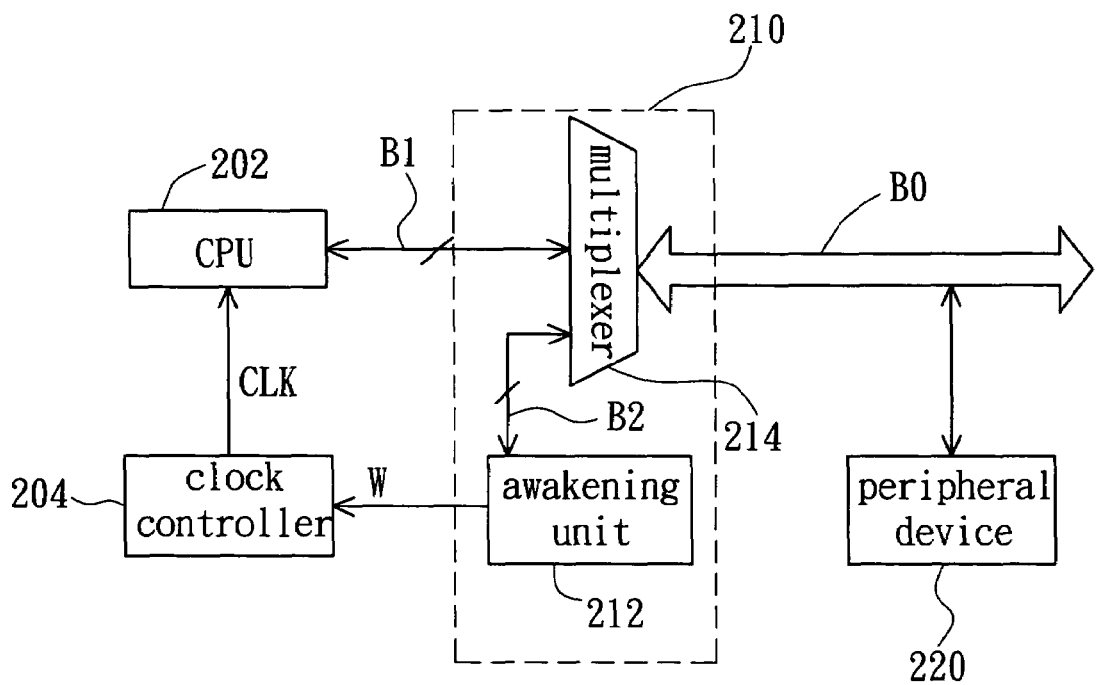
FIG. 2 is a block diagram of the electronic apparatus having an inquiring apparatus according to a preferred embodiment of the invention.

Referring to FIG. 2, a block diagram of the electronic apparatus having an inquiring apparatus according to a preferred embodiment of the invention is shown. The electronic apparatus 200 includes a CPU 202, a clock controller 204, an inquiring apparatus 210, and a peripheral device 220. The clock controller 204 outputs the clock CLK to the CPU 202 for CPU operation. The CPU 202 communicates with the peripheral device 220 via the bus B1, the inquiring apparatus 210, and the main bus B0.

When the CPU 202 needs to inquire the current state of the peripheral device, the inquiring apparatus 210 is activated, instead of the CPU 202, to perform the repeatedly inquiring process. At this time, the clock controller 204 stops outputting the clock signal CLK to the CPU 202 so as to save power. The inquiring apparatus 210 inquires the current state of the peripheral device 220 via the main bus B0, and outputs an awakening signal W to the clock controller 204 as the peripheral device 220 comes to the expected state. As the clock controller 204 receives the awakening signal W, it will output the clock signal CLK to the CPU 202 again. When the CPU 202 is not required to perform the repeatedly inquiring process, the inquiring apparatus 210 is disabled and just transmits signals between the bus B1 and the main bus B0.

The inquiring apparatus 210 includes an awakening unit 212 and a multiplexer 214, which is coupled to the awakening unit 212 via the bus B2. When the CPU 202 is not required to perform the repeatedly inquiring process, the multiplexer 214 couples the bus B1 with the bus B2. When the CPU 202 needs to inquire the current state of the peripheral device, the CPU activates the inquiring apparatus 210 so that the multiplexer 214 couples the bus B2 with the main bus B0, and then the awakening unit 212 inquires the current state of the peripheral device 220. When the peripheral device 220 comes to the expected state, the awakening unit 212 outputs an awakening signal W to the clock controller 204.

Figure 3:
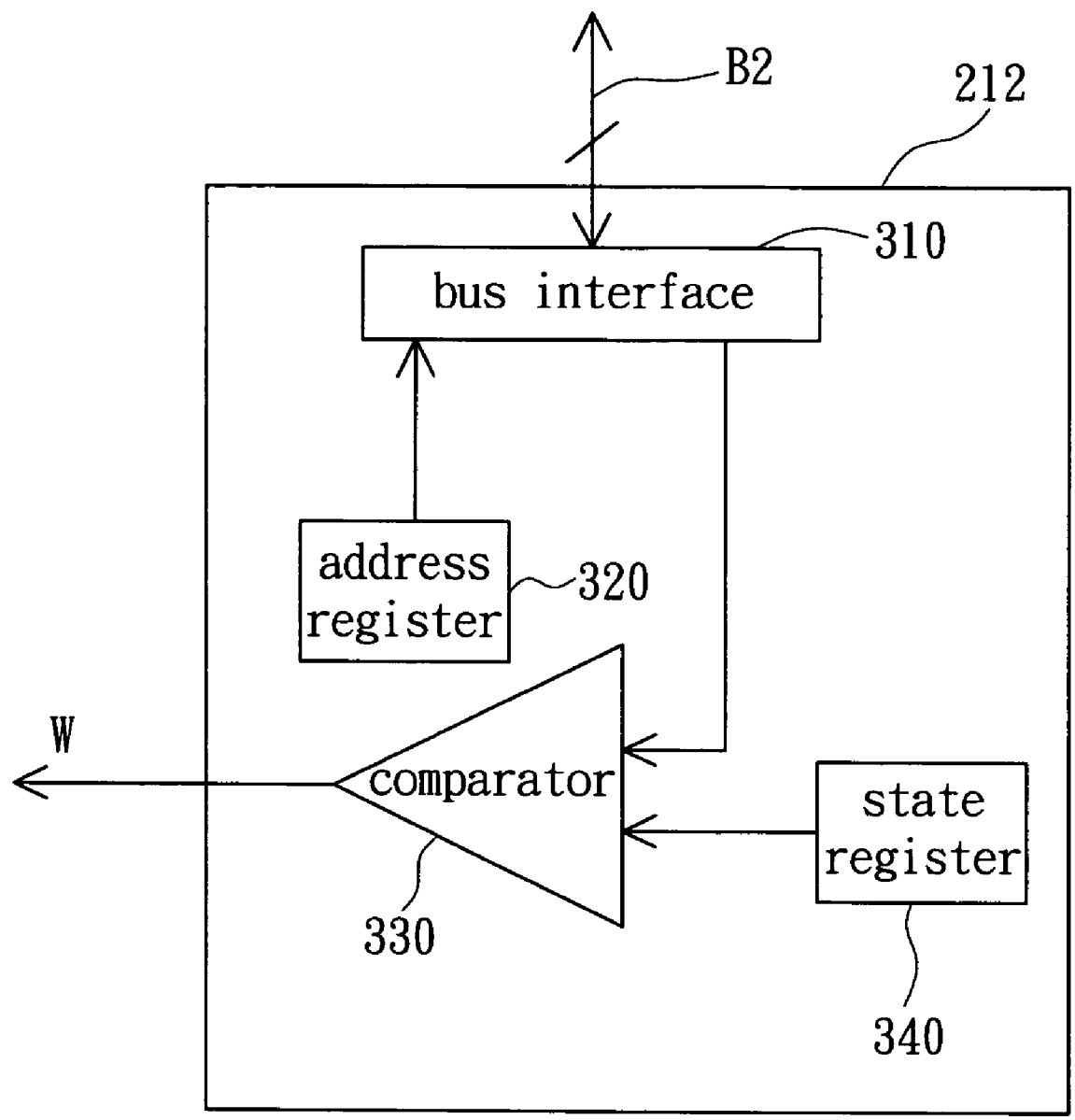
FIG. 3 is a block diagram of the awakening unit in FIG. 2.

Referring to FIG. 3, a block diagram of the awakening unit in FIG. 2 is shown. The awakening unit 212 includes a bus interface 310, an address register 320, a comparator 330, and a state register 340. The bus interface 310 transmits and receives signals on the bus B2. The address register 320 stores the address of the peripheral device 220 by which the inquiring apparatus 210 can repeatedly inquire the current state of the peripheral device 220. The state register 340 stores the expected state of the peripheral device 220. The comparator 330 compares the current state of the peripheral device 220 outputted by the bus interface 310 with the expected state in the state register 340, and determines if two states are the same. If two states are the same, the awakening unit 212 outputs an awakening signal. The awakening unit 212 is not limited to the logic circuit construction as mentioned above, and can be a simple and power-saving processor.

Figure 4:
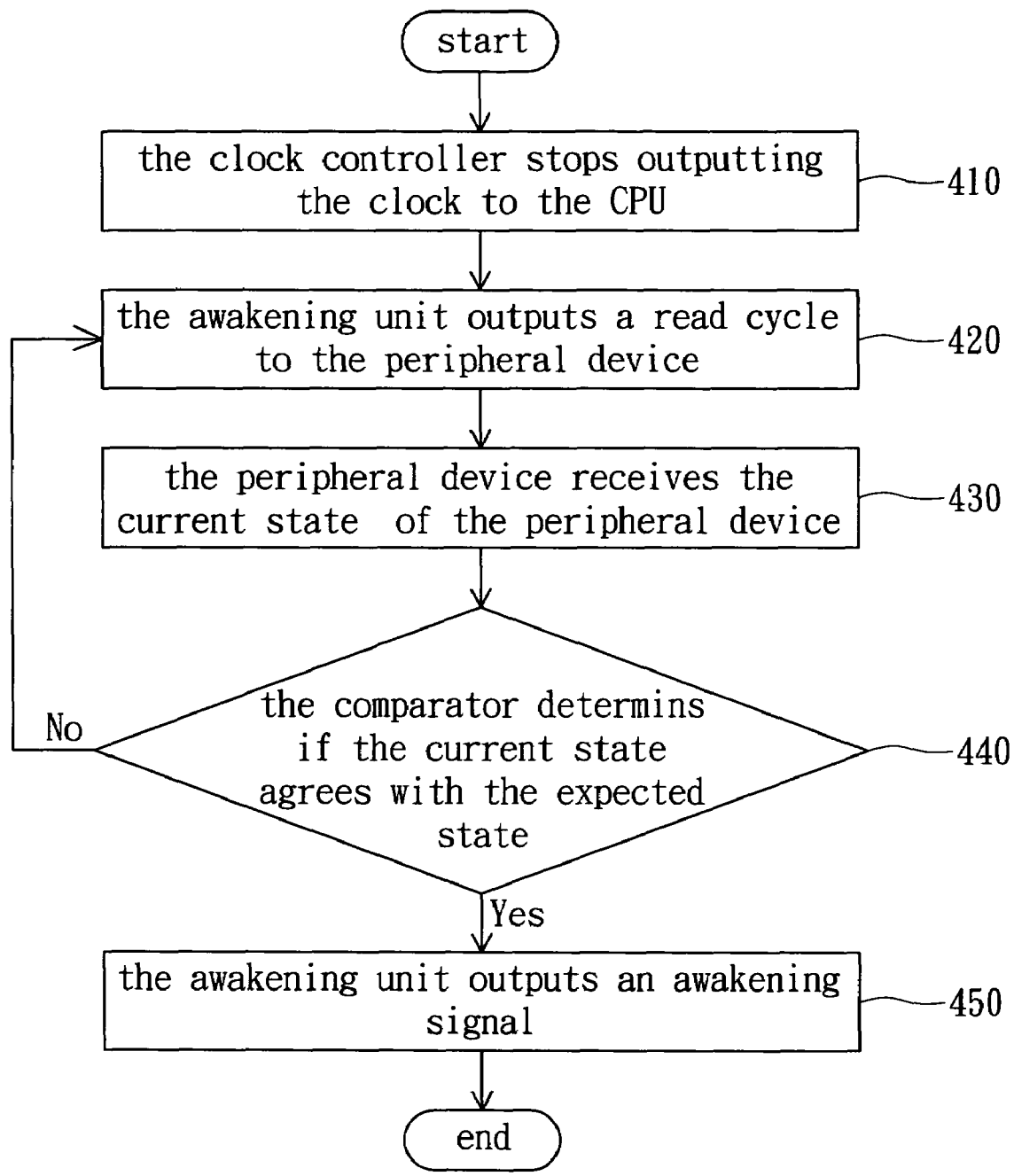
FIG. 4 is a flow chart of the repeatedly inquiring process performed in the electronic apparatus having the inquiring apparatus.

Referring to FIG. 4, a flow chart of the repeatedly inquiring process performed in the electronic apparatus having the inquiring apparatus is shown. When the CPU 202 needs to wait for the peripheral device 220 to come to the expected state for follow-up operation, the CPU 202 stores the address of the peripheral device 220 into the state register 340 and stores the expected state of the peripheral device 220 into the state register 340. In the step 410, the clock controller 204 stops outputting the clock CLK to the CPU 202, and thus power for outputting the clock CLK at that time can be saved. Afterwards, in the step 420, the multiplexer 214 couples the bus B2 with the main bus B0, and the awakening unit 212 outputs a read cycle according to the address register 320. In the step 430, after receiving the read cycle, the peripheral device provides its current state for the awakening unit 212. In the step 440, the comparator 330 in the awakening unit 212 determines if the current state of the peripheral device agrees with the expected state in the state register 340. If it does, the awakening unit 212 outputs an awakening signal W in the step 440, and the method is ended. If it does not, the approach goes back to the step 420 and continues the inquiring process.

The inquiring apparatus disclosed by the above-mentioned embodiment in the invention, instead of the CPU, can perform the repeatedly inquiring process. Since the CPU is placed in a power-saving state in which no clock is outputted to the CPU when the inquiring process is performed by the inquiring apparatus, power consumption can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An inquiring apparatus, provided in an electronic apparatus having a central processor unit (CPU), the electronic apparatus comprising a clock controller, and a main bus, the inquiring apparatus comprising:

a multiplexer for selectively coupling a first bus or a second bus with the main bus, peripheral device associated with an address;

wherein when the CPU needs to wait for the peripheral device coupled to the main bus to come to an expected state, the CPU activates the inquiring apparatus to inform an awakening unit of the address of the peripheral device and to make the multiplexer couple the second bus with the main bus so that the awakening unit, instead of the CPU, repeatedly inquires the current state of the peripheral device associated with the address to determine whether the current state of the peripheral device agrees with the expected state and so that the CPU is placed into a power-saving state in which the clock controller stops outputting a clock to the CPU.

2. The inquiring apparatus according to claim 1, wherein when the current state agrees with the expected state, the awakening unit outputs an awakening signal to the clock controller.

3. The inquiring apparatus according to claim 2, wherein after receiving the awakening signal, the clock controller outputs the clock to the CPU again.

4. The inquiring apparatus according to claim 2, wherein the awakening unit comprises:

an address register for storing the address of the peripheral device;

a state register for storing the expected state of the peripheral device;

a bus interface coupled to the second bus for providing a read cycle according to the address and receiving the current state responded by the peripheral device; and a comparator for comparing the current state with the expected state and accordingly outputting the awakening signal.

5. The inquiring apparatus according to claim 4, wherein when the CPU enables the awakening unit, the CPU stores the address of the peripheral device in the address register, and stores the expected state in the state register.

6. The inquiring apparatus according to claim 1, wherein when the CPU is not required to wait for the peripheral device to come to the expected state, the multiplexer couples the first bus with the main bus.

7. An inquiring method, for assisting a CPU to repeatedly inquire a peripheral device, the method comprising steps of:
when the CPU needs to perform an inquiring process to wait for the peripheral device to come to an expected state, activating an inquiring apparatus, instead of the CPU, to perform an inquiring process;
placing the CPU in a power-saving state which stops outputting a clock to the CPU when the inquiring apparatus performs the inquiring process;
wherein the inquiring process comprises:
outputting a read cycle to the peripheral device to inquire a current state of the peripheral device;
receiving the current state of the peripheral device in response to the read cycle; and
comparing the current state with the expected state.

8. The inquiring method according to claim 7, wherein when the inquiring process performed by the inquiring apparatus determines that the current state agrees with the expected state, the awakening unit enables the clock controller to output the clock to the CPU again.

9. An electronic apparatus comprising:
a processor;
a clock controller;
an inquiring apparatus comprising:
an awakening unit, which is activated instead of the processor to inquire a current state of a peripheral device associated with an address on a main bus when the processor activates the inquiring apparatus to inform the awakening unit of the address of the peripheral device;
a multiplexer for selectively coupling one of the processor and the awakening unit to the main bus; and
wherein when the processor needs to wait for a peripheral device coupled to the main bus to come to an expected state, the processor activates the inquiring apparatus to inform the awakening unit of the address of the peripheral device and to make the multiplexer couple the awakening unit to the main bus so that the awakening unit, instead of the processor, repeatedly inquires the current state of the peripheral device associated with the address to determine whether the current state of peripheral device agrees with the expected state and so that the processor is placed into a power-saving state in which the clock controller stops outputting a clock to the processor.

10. The electronic apparatus according to claim 9, when the processor needs to wait for the peripheral device coupled to the main bus to come to the expected state, the processor stores the address of the peripheral device in the awakening unit to activate the inquiring apparatus.

11. The electronic apparatus according to claim 9, when the processor needs to wait for the peripheral device coupled to the main bus to come to the expected state, the processor stores the expected state in the awakening unit to activate the inquiring apparatus.

12. The electronic apparatus according to claim 9, wherein the awakening unit comprises a bus interface for providing a read cycle according to the address and receiving the current state responded by the peripheral device associated with the address.

13. The electronic apparatus according to claim 12, wherein the awakening unit further comprises:
an address memory for storing the address of the peripheral device;
a state memory for storing the expected state of the peripheral device; and
a comparator for comparing the current state with the expected state and accordingly outputting the awakening signal.

14. The electronic apparatus according to claim 13, when the processor needs to wait for the peripheral device coupled to the main bus to come to the expected state, the processor stores the address of the peripheral device in the awakening unit to activate the inquiring apparatus.

15. The electronic apparatus according to claim 13, when the processor needs to wait for the peripheral device coupled to the main bus to come to the expected state, the processor stores the expected state in the awakening unit to activate the inquiring apparatus.

* * * * *